2,478,911

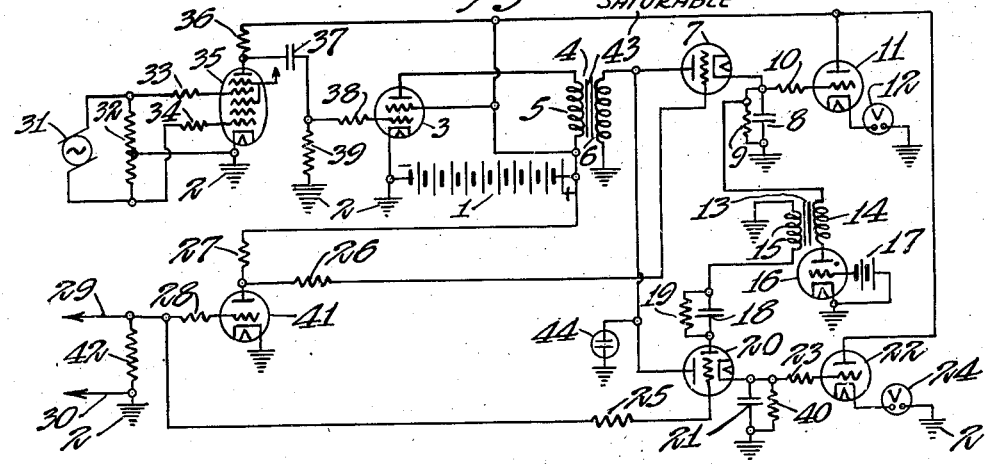
Aug. 16, 1949.  O. T. FRANCIS  2,478,911
ELECTRONIC COUNTER DURATION INDICATOR
Filed Feb. 1, 1945
Inventor
Oliver T. Francis Patented Aug. 16, 1949

UNITED STATES PATENT OFFICE 2,478,911

ELECTRONIC COUNTER DURATION INDICATOR

Oliver T. Francis, Renville, Minn.

Application February 1, 1945, Serial No. 575,583

7 Claims. (Cl. 235—92)

This invention relates to electronic counters, and more particularly to a means for counting the pulses produced at a predetermined frequency for a duration to be determined.

Various impulse duration indicating devices are known. These devices usually take the form of means for changing the charge on a condenser at a predetermined rate for the duration of the impulse and indicating the charge remaining on the condenser at the end of said duration. The accuracy of said devices depends on the constancy of sources of voltage, which sources comprise the "B" and "C" batteries in vacuum tube duration indicating circuits. Sources of "B" battery are usually obtained from rectifying alternating current, and even with the most advanced voltage regulator systems it is impossible to obtain a constant "B" supply if the alternating current voltage varies over wide latitudes. Commercial alternating current voltages vary as much as ten percent, and with small plants, such as found aboard ship, the variation may be as much as forty percent. It is one of the objects of this invention to provide an impulse duration indicating device which shall be accurate regardless of wide variations in "B" and "C" battery voltages.

Due to the phenomenon of resonance it has been possible to produce alternating currents of very exact predetermined frequency. At radio transmitting stations, for example, a variation of one-ten thousandth of the frequency from that assigned is inexcusable. It is one of the objects of this invention to provide pulses at a constant frequency for the duration of an impulse and to count the number of pulses so produced as an indication of said duration.

Another object is to provide an accurate electronic counter which shall be substantially independent of "B" and "C" battery voltage variations.

Due to the phenomenon of magnetic saturation the amount of energy that can be stored in an iron core inductance is limited and is substantially independent of current flowing through the inductance after the saturation value is reached. It is one of the objects of this invention to provide an electronic counter which shall total the energy stored in such an inductance a number of times to be counted.

Another object is to provide a means for passing current through the primary of a transformer a number of times to be determined, and means including the secondary of said transformer for indicating the total amount of energy stored in the core of said transformer.

Another object is to provide a screen grid tube for passing a current from a voltage source through an inductance a number of times, said tube having a sufficiently high A. C. impedance to limit said current to a predetermined magnitude regardless of variations in voltage of said source, and means for indicating the total energy stored in said inductance.

Another object is to provide means for discharging the storing means when it has reached a predetermined voltage and a second electronic counter for indicating the total number of time said storing means reaches that voltage.

Another object is to provide an auxiliary means for operating said second electronic counter, whereby the total number indicated by said second counter may be the total of the number of times the first counter reaches said predetermined voltage plus the amount produced by said auxiliary means.

The utilization of a first electronic counter for indicating the "units" and a second for the "tens" has been proposed. It is an object of this invention to provide such a plurality of cascade connected counters, wherein the "tens" counter may be actuated by clearing the "unit" counter and an auxiliary means for operating the "tens" counter, to add numbers with a "ten" component.

Another object is to provide a means for adding two successive different duration impulses and indicating the total duration of said two impulses.

Another object is to provide a means for adding a signal having a "unit" and a "ten" component.

Another object is to provide a novel wave shaping device for pulses to be counted.

These and other objects will become apparent from the following claims, description and figures, wherein:

Fig. 1 shows an impulse duration indicating device embodying my invention, and,

Fig. 2 shows a plurality of impulses, for applying to my device, and Fig. 3 is a modification of Fig. 1.

Referring to Fig. 1, vacuum tube 35 is of the multiple grid type, such as a pentigrid converter. Its first grid is connected through resistance 34 to one terminal of an alternating current generator 31. Its fourth grid is connected to the other terminal of generator 31 through resistance 33. Its cathode is connected to the mid-point on resistance 32, which latter resistance is across generator 31. The output circuit of tube 35 can be traced from the positive terminal of battery 1, through resistance 36, anode to cathode of tube 35, to the ground 2 terminal of battery 1. The anode of tube 35 is connected through condenser 37 and resistance 38 to the control grid of a high A. C. impedance screen grid vacuum tube 3. Resistance 39 is connected as a grid leak for this control grid. The screen grid of tube 3 is connected to the positive terminal of battery 1. The output circuit of tube 3 may be traced from the positive terminal of battery 1, through primary 5 of transformer 4, plate to cathode of tube 3, to the ground terminal 2 of battery 1.

One terminal of secondary 6 of this transformer is connected to ground 2. The other terminal is connected through the plate cathode path of grid controlled vacuum tube 7, and resistance 9 in parallel with condenser 8 to ground. The cathode of 7 is connected through resistance 10 to the grid of vacuum tube voltmeter 11 of the cathode follower type. The output circuit of tube 11 can be traced from the positive terminal of battery 1, plate to cathode of tube 11, voltmeter 12, to ground 2. A clearing circuit is connected across condenser 8, comprising primary 14 of transformer 13, anode to cathode of grid controlled gas discharge device 16, the cathode of device 16 being connected to ground 2. A "C" battery 17 determines the anode voltage at which device 16 breaks down, and discharges condenser 8.

Also across the secondary 6 is connected the anode and cathode of a second grid controlled vacuum tube 20, and resistance 40 in parallel with condenser 21. The cathode of vacuum tube 20 is connected through resistance 23 to the grid of vacuum tube voltmeter 22 of the cathode follower type. The output circuit of tube 22 can be traced from the positive terminal of battery 1, plate to cathode of tube 22, voltmeter 24, to ground 2. One terminal of the secondary 15 of transformer 13 is connected through resistance 19 in parallel with condenser 18, to a rectifier auxiliary anode and cathode of tube 20, and through resistance 40 in parallel with condenser 21 to ground 2. The control grid of vacuum tube 20 is connected through resistance 25 to line 29.

The control grid of tube 7 is connected through resistance 26 to the plate of vacuum tube 41. The output circuit of tube 41 can be traced from the positive terminal of battery 1, through resistance 27, plate to cathode of tube 41, to the ground terminal of battery 1.

Line 30 is connected to ground 2 and resistance 42 is connected across lines 29 and 30 to maintain line 29 at ground potential when no signal is being received.

A source of high voltage such as 1, is subject to considerable undesirable voltage variations. Especially is this the case if it is obtained from rectifying an alternating current, where as stated above the voltage regulation may be as bad as forty percent. Such deleterious voltage variations would make conventional signal duration indicating devices, or electronic counters supplied from said source inoperable. I compensate for such deleterious variations in battery 1 by using a transformer 4, the core 43 of which saturates even on the lowest voltage of battery 1. As a further compensation for deleterious voltage variations of battery 1, I use a high A. C. impedance screen grid tube 3 in series with primary 5. By permitting the core 43 to saturate during the period of time that tube 3 is conductive to plate current, a definite amount of energy is stored in core 43, and this definite amount of energy is not affected by voltage variations in battery 1 by reason of the fact that it is substantially saturated even when battery 1 is at its lowest value. When a negative potential is instantaneously applied to the grid of tube 3, this definite amount of energy is transferred to condenser 8 by the secondary 6 through rectifier 7. It is evident therefore that in my electronic counter a definite number of coulombs of electricity is stored in condenser 8, if tube 7 is conductive each time the grid of tube 3 causes the impedance of tube 3 to assume a negative current cut-off value, and that, due to the phenomena of saturation of core 43, and the high A. C. plate impedance of tube 3, this number of coulombs does not vary appreciable with voltage variations of battery 1.

The detailed operation of my duration indicating device is as follows. Generator 31 produces alternating current at a constant predetermined frequency, the voltage of which may be several hundred volts. Vacuum tube 35 is conductive to plate current for two brief instants during each cycle of this alternating current, namely, when it is substantially zero. The high resistances 33 and 34 prevent either the first or the fourth grids of tube 35 from assuming a high positive potential. These brief surges of current through resistance 36 and the plate impedance of tube 35, cause the plate of tube 35 to go negative for brief instants such as shown between 71, 72 and 73, 74 of graph 75 of Fig. 2. These negative voltages are impressed on the control grid of tube 3 through condenser 37 and resistance 38, causing the plate impedance of tube 3 to assume an infinite value for brief instants. The magnetic energy in the core of transformer 4 collapses each time its primary circuit is rendered an open circuit by said infinite impedance of tube 3, causing a high voltage to be built up across secondary 6. If a negative impulse as shown between 71, 72, graph 70 of Fig. 2, is impressed on line 29, the plate of tube 41 assumes a high positive potential and this high positive potential is impressed on the grid of rectifier 7 through high resistance 26. The surges across the secondary 6 then pass from the plate 10 to cathode of vacuum tube 7 and charge condenser 8 by an increment each time the magnetic energy of core 43 collapses. Resistance 9 is of very high value and consequently the charge on condenser 8 is retained an appreciable length of time. The grid of tube 7 remains at a positive potential for the entire time between times 71 and 72 of Fig. 2, thereby permitting condenser 8 to be charged by increments from secondary 6 during this entire time.

If a positive impulse is impressed on line 29, as shown between time 73, 74 graph 70 of Fig. 2, the plate of tube 41 is substantially at ground potential, and the plate impedance of rectifier 7 is substantially infinite. This positive impulse is impressed on the grid of vacuum tube 20 through resistance 25. The plate impedance of vacuum tube 20 becomes low, permitting the positive pulses across secondary 6 to charge condenser 21 by increments each time the magnetic field of core 43 collapses from time 73 to 74 of Fig. 2. The charges remaining on condensers 8, 21 can be read on voltmeters 12, 24, respectively. Since condenser 8 has received charges resulting from three collapses of the magnetic field of core 43, voltmeter 12 reads three. Since condenser 21 has received five charges voltmeter 24 reads five. Condenser 8 indicates the "units" and condenser 21 the "tens" therefore the number 53 has been transmitted over lines 29, 30.

After the unit condenser 8 receives a charge of ten increments, gas discharge device 16 breaks down, discharging condenser 8. Resistance 19, condenser 18 have been chosen of such values that the increment impressed on condenser 21 by secondary 15 when the breakdown occurs increases the reading on voltmeter by one number.

When no signal has been received for some time and the grids of both tubes 7 and 20 are at ground potential, the secondary 6 maintains a no signal voltage across condensers 8 and 21, the magnitude of which voltage depends on the amplification factor of tubes 7 and 20. By selecting tubes with the proper amplification factor and shunting a voltage regulator, here shown as a gas discharge device 44 across secondary 6, it is possible to make this no signal voltage the same as the voltage to which the clearing circuit discharges condenser 8. For example, the break down voltage of device 44 may be 465 volts, the amplification factor of tube 7 may be 30. Then the no signal voltage across condenser 8 is 15 volts, since tube 7 would be biased past its current cutoff at minus 15 volts with 450 volts on its plate. When the sum of the voltage across condenser 8 and the plate impedance of tube 7 exceeds 465 volts, device 44 breaks down and short circuits the pulse across secondary 6 to ground 2. Gas discharge device 16 may be so chosen that condenser 8 discharges to 15 volts when condenser 8 clears as above described.

The incremental charges received by condensers 8 and 21 resulting from the collapse of field in core 43 are of brief duration. It is possible, however, that the beginning or the end of an impulse may occur during this collapse. In order to prevent false readings, I have chosen impulses differing in duration sufficiently to make such possible error negligible. In other words the duration between collapses of the field in core 43 is small compared with the differences in length of durations of impulses to be measured.

Fig. 3 shows a modification of Fig. 1, wherein vacuum tubes of the screen grid type are used as rectifiers and screen grid vacuum tubes are also used in the vacuum tube voltmeter circuits. The circuit shown in Fig. 3 has advantages over Fig. 1 in that the cathodes of all the tubes (except the clearing gas discharge device 16) are at ground potential. Also the A. C. impedances of the screen grid tubes tend to compensate for undesirable variations in "B" supply. The principal disadvantage of the circuit shown in Fig. 3 over that shown in Fig. 1 is that the ground terminal 52 of battery 1 is not at the negative terminal of that battery thereby causing some undesirable coupling effects not present in Fig. 1. In describing Fig. 3 component parts of the circuit performing identical functions have been assigned the same reference numeral as in Fig. 1.

Referring to Fig. 3, a source of negative pulses to be counted is impressed across resistance 39, and through resistance 38 onto the grid of vacuum tube 3. These negative pulses block current through primary 5, and as core 43 collapses, a voltage is produced across secondary 6. Thus far the functioning of Figs. 1 and 3 are identical.

Across secondary 6 is connected condenser 8 in parallel with resistance 9, and rectifier 56 here shown as a screen grid vacuum tube. The screen grid of tube 56 is connected to the positive terminal of battery 1. Its cathode is connected to ground 52. To measure the voltage across condenser 8 a screen grid vacuum tube voltmeter 53 is connected. The output circuit of tube 53 can be traced from the positive terminal of battery 1, through voltmeter 54, to the anode and cathode of tube 53, and to the ground terminal of battery 1. The clearing circuit of condenser 8 includes ground 52, the primary 14, the anode and cathode of gas discharge device 16. Biasing battery 17 has been connected in the grid circuit of this device, to render it conductive only at a desired plate voltage.

Line 29 is connected to the grid of vacuum tube 41 through resistance 28. The output circuit of tube 41 includes the positive terminal of battery 1, resistance 27, anode and cathode of tube 41, and the ground terminal of battery 1. The anode of tube 41 is connected through voltage divider 60 to the negative terminal of battery 1. The control grid of tube 55 is connected through resistance 26 to an intermediate point on divider 60.

Transformer 4 has an auxiliary secondary 58. Across secondary 58 is connected condenser 21 in parallel with resistance 49 and screen grid vacuum tube rectifier 57. The screen grid of tube 57 is connected to the positive terminal of battery 1. Its cathode is connected to ground 52.

Vacuum tube voltmeter comprising screen grid tube 55 and voltmeter 56 is connected to measure the voltage across condenser 21. Secondary 15 is connected through condenser 18 in parallel with resistance 19 to an auxiliary anode in tube 57. The control grid of tube 57 is connected through resistance 25 to a mid-point on voltage divider 61 of high ohmic value. One terminal of this voltage divider is connected to the negative terminal of battery 1, and the other terminal is connected to line 29. A voltage limiter comprising gas discharge device 44 is connected across the secondary 58.

In operation when the field of core 43 collapses a high voltage is set up across secondaries 6 and 58. If a negative impulse is being impressed on line 29, the plate of tube 41 assumes a positive potential and a positive potential is impressed on the control grid of tube 56, permitting current to flow from the lower terminal of secondary 6, anode to cathode of tube 56, through condenser 8 to the upper terminal of secondary 6, charging the lower plate of condenser 8 positive. Condenser 8 continues to be charged by an increment each time the core 43 collapses as long as tube 56 is conductive.

If a positive impulse is impressed on line 29, the control grid of tube 57 is positive, and current flows from the lower terminal of secondary 58 through the plate impedance of tube 57 and condenser 21 to the upper terminal of secondary 58, charging condenser 21 by an increment each time core 43 collapses. The R. C. time element of resistance 19, condenser 18 has been so chosen as to impress an incremental charge on condenser 21 each time condenser 8 clears through primary 14 and gas discharge device 16. Condenser 8 is in the input circuit of tube 53. Condenser 21 is in the input circuit of tube 55. Tubes 53, 55 being of the screen grid type have a high A. C. plate impedance, and consequently the current through voltmeters 54, 56 is not appreciably affected by large deleterious variations in "B" voltage of battery 1.

If no signal is received over line 29, the control grids of both tubes 56, 57 are biased past the current cutoff and a very high voltage tends to build up across secondaries 6, 58. To prevent damage to circuit elements, gas discharge device 44 has been shunted across secondary 58 as a protective device.

It is obvious that my invention may take widely different forms from these illustrated, and it is to be limited in scope only as defined in the following claims.

What I claim is:

1. An electronic counter comprising: a transformer having a primary, a secondary and a core, a vacuum tube having a plate, cathode and grid, a source of voltage, means for connecting said source of voltage, said primary, said plate, and said cathode in series, a rectifier, an accumulator condenser, means for connecting said secondary, said rectifier, and said condenser in series, means for maintaining said grid at a sufficiently positive potential to cause the current in said primary to saturate said core, means for impressing a negative potential on said grid to cause substantially all the energy stored in said core to be dissipated in current flow in the circuit of said secondary, and impress an incremental charge on said condenser, said last means comprising an electronic switch controlled by a source of predetermined frequency, and means for indicating the charge of said condenser.

2. In an impulse polarity and duration indicating device, the secondary of a transformer, means for varying the energy content of the total current flowing in said secondary in accordance with the duration of an impulse to be measured, a plurality of condensers, means for charging any selected one of said condensers with said current depending on the polarity of said impulse, and means for indicating the charges on said condensers.

3. In an impulse duration indicating device, means for producing, at a predetermined frequency, increments of electrical current having substantially equal energy content for the duration of an impulse to be measured, a plurality of accumulator condensers, means responsive to the direction of voltage change of said impulse for applying said increments to any selected one of said condensers for said duration, and means for indicating the voltage of the charge on each of said condensers.

4. In an electronic counter, means for producing increments of electrical current having substantially equal energy content, a plurality of accumulator condensers, means for receiving input pulses, a device having a plurality of units, each unit being conductive at a different polarity of voltage of said pulses, a plurality of parallel circuits connected across said increment producing means, each of said circuits comprising a separate one of said units and a separate one of said condensers, and means for indicating the charges on said condensers.

5. An impulse duration responsive device, comprising: a plurality of accumulator condensers, a transformer having a primary, a secondary, and a core, means for passing a current through said primary to saturate said core, means for interrupting said current at a predetermined frequency throughout the duration of an impulse to produce increments of electrical current in said secondary of substantially equal energy content, means for charging any one of said condensers with said increments depending on the polarity of said impulse, and means for indicating the charge on said condensers.

6. An impulse duration indicating device, comprising: a plurality of accumulator condensers, a transformer having a primary, a secondary and a core, a source of current, a vacuum tube having an input and an output circuit, means for connecting said source, and said primary in said output circuit, means for impressing a positive voltage on said input circuit to produce a current flow in said output circuit to saturate said core, a selector having a plurality of vacuum tubes, the plate impedance of each of said last tubes being small depending on the direction of voltage change of an impulse, a plurality of circuits connected across said secondary, each of said last circuits including a separate one of said condensers and the plate impedance of a separate one of said last tubes, means for impressing negative blocking potentials at a predetermined frequency on said input circuit to impress incremental charges on a selected one of said condensers depending on said direction of change of said impulse, and means for indicating the charges on said condensers.

7. An impulse duration indicating device comprising: a transformer having a core, a primary, and a plurality of secondaries, means for passing a current through said primary to saturate said core, a selector, having units each conductive at different polarities of an impulse to be measured, a plurality of accumulator condensers, means for electrically connecting a separate one of said units and a separate one of said condensers across each of said secondaries, means for interrupting the current in said primary at a predetermined frequency to charge a selected one of said condensers depending on the polarity of said impulse, and means for indicating the charge on said condensers.

OLIVER T. FRANCIS.

REFERENCES CITED

The following references are of record in the file of this patent:

UNITED STATES PATENTS

| Number | Name | Date |
|---|---|---|
| 1,755,060 | Gay | Apr. 15, 1930 |
| 1,933,976 | Hanson | Nov. 7, 1933 |
| 2,110,015 | Fitzgerald | Mar. 1, 1938 |
| 2,272,998 | Bjornson | Feb. 10, 1942 |
| 2,284,101 | Robins | May 26, 1942 |
| 2,332,300 | Cook | Oct. 19, 1943 |